United States Patent [19]

Côté

[11] 4,125,958

[45] Nov. 21, 1978

[54] TENSION RELEASE COUPLING FOR FISHING LINE

[76] Inventor: Bernard Côté, 12770 St. Evariste St., Montreal, Canada

[21] Appl. No.: 776,220

[22] Filed: Mar. 10, 1977

[30] Foreign Application Priority Data

Jun. 25, 1976 [GB] United Kingdom ............... 26490/76

[51] Int. Cl.² ............................................... A01K 91/00
[52] U.S. Cl. ................................................... 43/43.12
[58] Field of Search ........................... 43/43.12, 44.83; 24/201 TR, 217 R

[56] References Cited

U.S. PATENT DOCUMENTS

| | | | |
|---|---|---|---|
| 3,210,883 | 10/1965 | Ulsh | 43/43.12 |
| 3,518,784 | 7/1970 | Kling et al. | 43/43.12 |
| 3,816,954 | 6/1974 | Bissonette | 43/43.12 |
| 3,905,148 | 9/1975 | Naone et al. | 43/43.12 |

*Primary Examiner*—Robert C. Watson

[57] ABSTRACT

A coupling assembly adapted to connect a fishhook to the remainder of a fishing line, including the lure, and which responds to tension on this remainder of the fishing line to release the same free of the fishhook when the latter catches a submerged obstacle. This tension release coupling assembly includes a resilient coupling member, such as of plastic, which is attached to the cord of the fishing line and which has a cavity therein adapted to releasably catch the eye of a common fishhook or an enlarged end portion of a specially made fishhook or hook connector member. The resilient coupling member may be calibrated in relation to the different strengths of cord used for the fishing lines such that the fishhook will be released before the tensional strength of the corresponding cord is reached. The resilient coupling members are colored in accordance with a code distinctive of the predetermined calibration of strength thereof.

5 Claims, 7 Drawing Figures

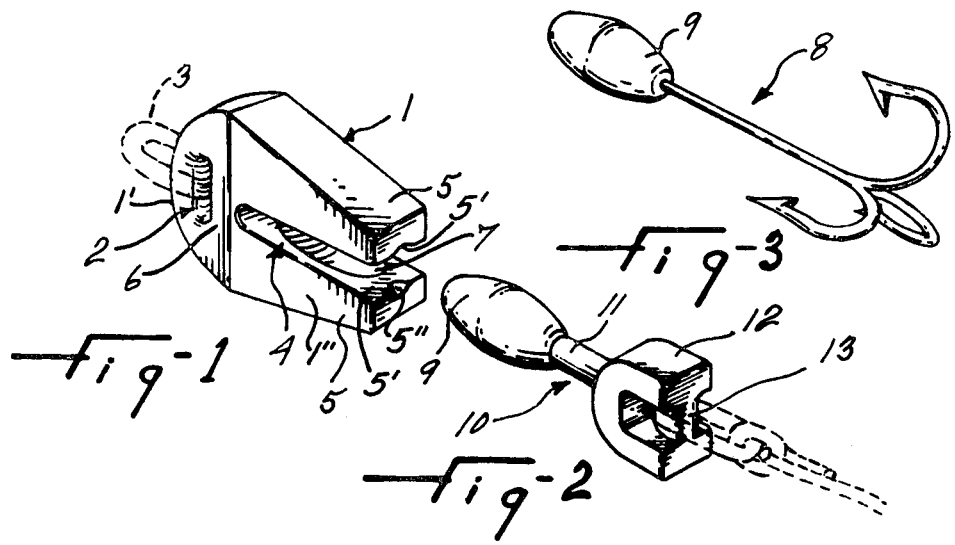
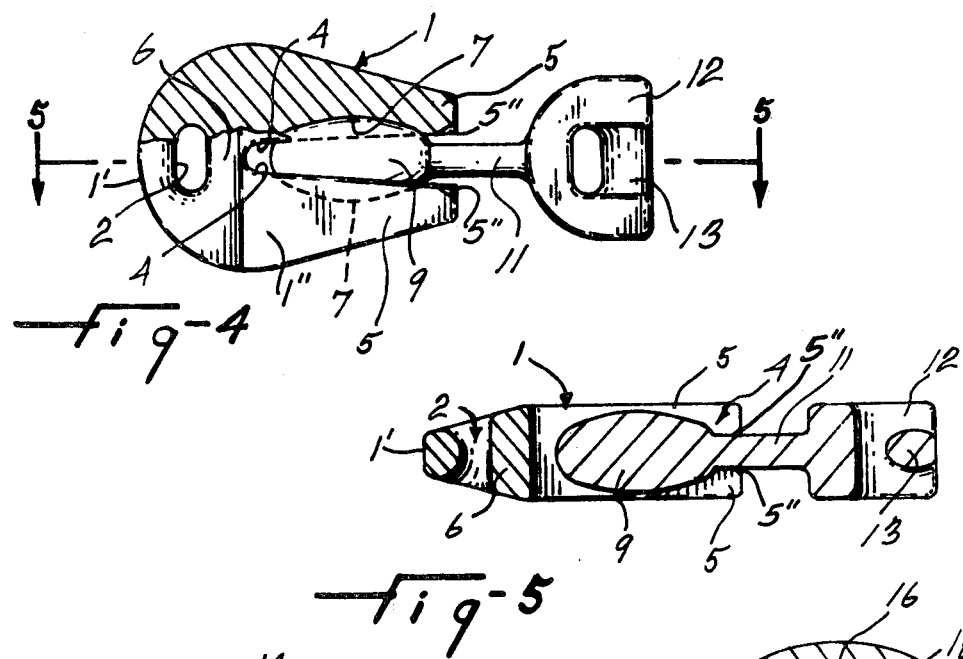
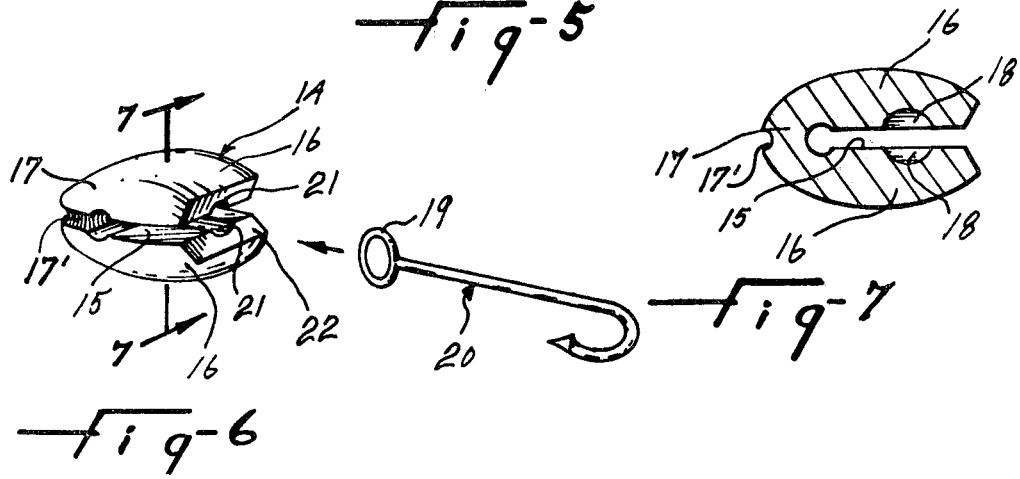

TENSION RELEASE COUPLING FOR FISHING LINE

This invention relates to a fishing line, and more particularly, to a tension release coupling adapted to secure a fishhook or fishhooks at the end of a fish-line.

Fishermen commonly encounter situations where the fishhook catches some submerged obstacle and he has no other alternative than to pull their line and hope for the best. Most often, this results in breaking of the line and losing the lure, fishhook, etc.

It is a general object of the present invention to provide for retrieval of a lure or lures attached to a fishing line when the corresponding fishhook catches a submerged obstacle.

It is a more specific object of the present invention to provide a coupling assembly for a fishing line whereby when the fishhook catches a submerged obstacle the fishhook is released by tension exerted on the line and allows retrieval of the entire line less only the hook.

It is a specific object of the present invention to provide a tension release coupling assembly which connects the fishhook to the remainder of the fishing line, including the lure or lures, whereby this remainder of the line is allowed to be released by tension thereon free of the fishhook when the latter catches a submerged obstacle.

The above and other objects and advantages of the present invention will be better understood with reference to the following detailed description of preferred embodiments thereof which are illustrated, by way of examples, in the accompanying drawings; in which:

FIG. 1 is a perspective view of a resilient coupling member according to a first embodiment of the present invention;

FIG. 2 is a perspective view of a connector member for a fishhook according to the present invention and usable with the resilient coupling member of FIG. 1;

FIG. 3 is a fishhook of special construction, according to the present invention, and usable instead of the connector member of FIG. 2 with the resilient coupling member of FIG. 1;

FIG. 4 is a side view partly in cross section of coupling member of FIG. 1 and of the connector member of FIG. 2

FIG. 5 is a cross-sectional view of the same coupling and connector members as seen along line 5—5 in FIG. 4;

FIG. 6 is a perspective view of a resilient coupling member according to a second embodiment of the present invention and with a conventional fishhook engageable therein; and FIG. 7 is a cross-sectional view of the resilient coupling member of FIG. 6 as seen along line 7—7 in this Figure.

The resilient coupling member 1 of the embodiment of FIGS. 1, 4, and 5 consists of an elongated one piece body of resilient plastic material having a rounded end 1' provided with a transverse aperture 2 to attach thereto the cord, not shown, of a fishing line. As indicated by the ring 3 in FIG. 1, this cord operatively extends in a direction away from the resilient coupling member 1.

A cavity or socket is formed in the resilient coupling member 1 and has an oval shape extending lengthwise in the operative direction of the cord. A slot 4 extends in the resilient coupling member 1 in the above mentioned operative direction and cooperatively defines the oval shape cavity. Slot 4 terminates short of end 1' and opens at the other end of the body and at each of the two opposite side faces 1" of the body. Thus body 1 defines a U shape member having a pair of opposite end arms 5, on opposite sides respectively of the slot 4, integrally interconnected by a transverse bight portion 6. Aperture 2 is made through bight portion 6. The internal face 5' of each opposite arm 5 is formed with a depression or recess 7 cooperating with the slot 4 to form the aforementioned oval shape cavity namely a cavity which has an oval shape longitudinal section and a circular cross section relative to the elongated body 1. Depressions 7 are in register transversely of body 1. Arms 5 taper towards their free ends.

The bight portion 6 is of predetermined cross-sectional area to produce a predetermined or selected resilience of the opposite arms 5 toward and away from each other. The outer free ends of arms 5 are each provided with a guiding notch 5" at least partially extending in flat face 5'. Notches 5" are in register with each other transversely of body 1 and with depressions 7 longitudinally of body 1.

The resilient coupling member 1 may be used in combination with a fishhook 8 to form one embodiment of a tension release coupling assembly. An oval shape head 9 is fixed to one end of the fishhook and extends lengthwise of the latter. This oval shape head 9 is of complementary shape relative to the oval shape cavity defined by the depressions 7 in the opposite arms 5 of the resilient coupling member 1. The oval shape head 9 is preferably made of plastic. As aforementioned, the bight portion 6 is of predetermined cross sectional size in relation to the desired resilience of the coupling member 1 to thus define a predetermined tension of release of the fishhook 8. Notches 5" guide head 9 by engaging the same during axial coupling movement of head 9 relative to body 1. Thus head 9 is properly and easily guided in depressions 7.

The resilient coupling member 1 may instead be used in combination with an intermediate connector member 10 to the free end of which the fishhook may be tied in any appropriate manner. The intermediate connector member 10 includes a central rod or stem 11, an oval shape head 9, and a shackle portion 12. The latter and the oval shape head 9 are fixed at the opposite ends respectively of the stem 11. Thus the oval shape head 9 snappingly engages between the opposite arms 5 and is releasable upon exerting a predetermined tension on the handle of the fishing line. The shackle portion 12 forms a transverse part 13 around which a line or cord may be tied or secured. Portion 12, being an enlargement of stem 11, can be easily grasped with one hand while the tapered arms 5 are grasped with the other hand to pull members 1 and 10 apart.

The resilient coupling member 14 according to a second embodiment of the present invention is also formed with a slot 15 extending therein in the operative direction defined by the cord of the fishing line relative to this coupling member 14. Thus, the latter includes a pair of opposite arms 16 on the opposite sides respectively of the slot 15. The cord of the fishing line can be attached by surrounding the bight portion 17 through the bottom of slot 15 and engaging groove 17'.

Bight portion 17 is of predetermined cross-sectional size in relation with the desired resilience of the opposite end portions relative to each other. In this case and in the case of bight portion 6, the cross-sectional size is selected such that the release of the fishhook will be done before the cord of the fishing line breaks. For instance, the tension required to release the fishhook should be equal or slightly less than the maximum tension rating of the cord used.

A pair of depressions 18 are formed into the inner face of the opposite arms 16 respectively and cooperatively form a circular cavity for the eye 19 of a conventional fishhook 20. The opposite arms 16 are also formed each with a trough 21 and a bevel lip 22 forming a guiding notch to ease and guide the insertion of the eye 19 into the circular cavity formed by the registering depressions 18.

The resilient coupling member 1 or 16 is formed of any suitable resilient plastic and is preferably colored according to a given color code indicative of the predetermined tension at which the fishhook 8 or 20 or the connector member 10 will be released to free the remainder of the fishing line.

For instance this tension rating could correspond to the rating of the fishing lines or cords on the market such that the fishermen could simply watch the rating of the coupling member with the rating of his cord or line.

I claim:

1. A tension release coupling assembly adaptable for a fishing line having a cord and a fishhook assembly, and comprising a resilient coupling member attachable to the cord and a connector member which is part of the fishhook assembly and releasably coupling with the coupling member, said coupling member consisting of a one piece body of resilient plastic and non compressible material, said body being elongated, having opposite sides and two opposite ends, and having a slot extending longitudinally thereof from one end towards but short of the other end, said slot opening at said opposite sides and at said one end and defining two elongated arms spaced from each other and integrally interconnected by a transverse bight portion at said other end, said transverse bight portion having a hole made therethrough for connection to said cord, said arms tapering in the direction of their free ends, having substantially flat internal surfaces facing each other and defining the side surfaces of such slot, each internal surface having a depression therein, the two depressions being in register transversely of the body, said depressions cooperatively forming a cavity with said slot, the free outer ends of said arms being each provided with a guiding notch extending at least partially in said internal surfaces, the two guiding notches being in register with each other transversely of the body and with said depressions longitudinally of the body, said connector member including an enlarged head removably insertable into said slot by movement along the longitudinal axis of said body by being guided by said guiding notches upon engagement therewith, said movement continuing until said head fully engages said depressions, said head having an external surface, complementary to said cavity.

2. A tension release coupling assembly as claimed in claim 1 wherein said cavity has an oval shape longitudinal section and a substantially circular cross-section relative to said body and said head having similarly an oval shape longitudinal section and a circular cross-section.

3. A tension release coupling assembly as claimed in claim 2 wherein said fishhook assembly includes a fishhook proper having a straight stem said connector member being formed directly on the outer end of said stem and secured thereto.

4. A tension release coupling assembly as claimed in claim 2 wherein said fishhook assembly includes a fishhook proper, a fastening cord attached to said fishhook proper at one end and to said connector member at the other end, said connector member including a stem integral with said head at one end and a shackle member integral with the other end of said stem and having an aperture made therethrough for attachment to said fastening cord.

5. A tension release coupling assembly as claimed in claim 1 wherein said cavity as a substantially circular longitudinal section and a substantially rectangular cross-section relative to said body and said fishhook assembly includes a fishhook proper having its stem formed at its outer end with an eye of circular longitudinal section and substantially rectangular cross-section with respect to the long axis of said stem, said eye defining said head.

* * * * *